Jan. 25, 1955 W. D. HOUGHTON 2,700,697

COLOR ADAPTER FOR MONOCHROME TELEVISION RECEIVERS

Filed April 27, 1951

INVENTOR
William D. Houghton
BY
Otis A. Mitchell
ATTORNEY 2,700,697

COLOR ADAPTER FOR MONOCHROME TELEVISION RECEIVERS

William D. Houghton, Princeton, N. J., assignor to Radio Corporation of America, a corporation of Delaware Application April 27, 1951, Serial No. 223,378

10 Claims. (Cl. 178—5.4)

Figure 1:
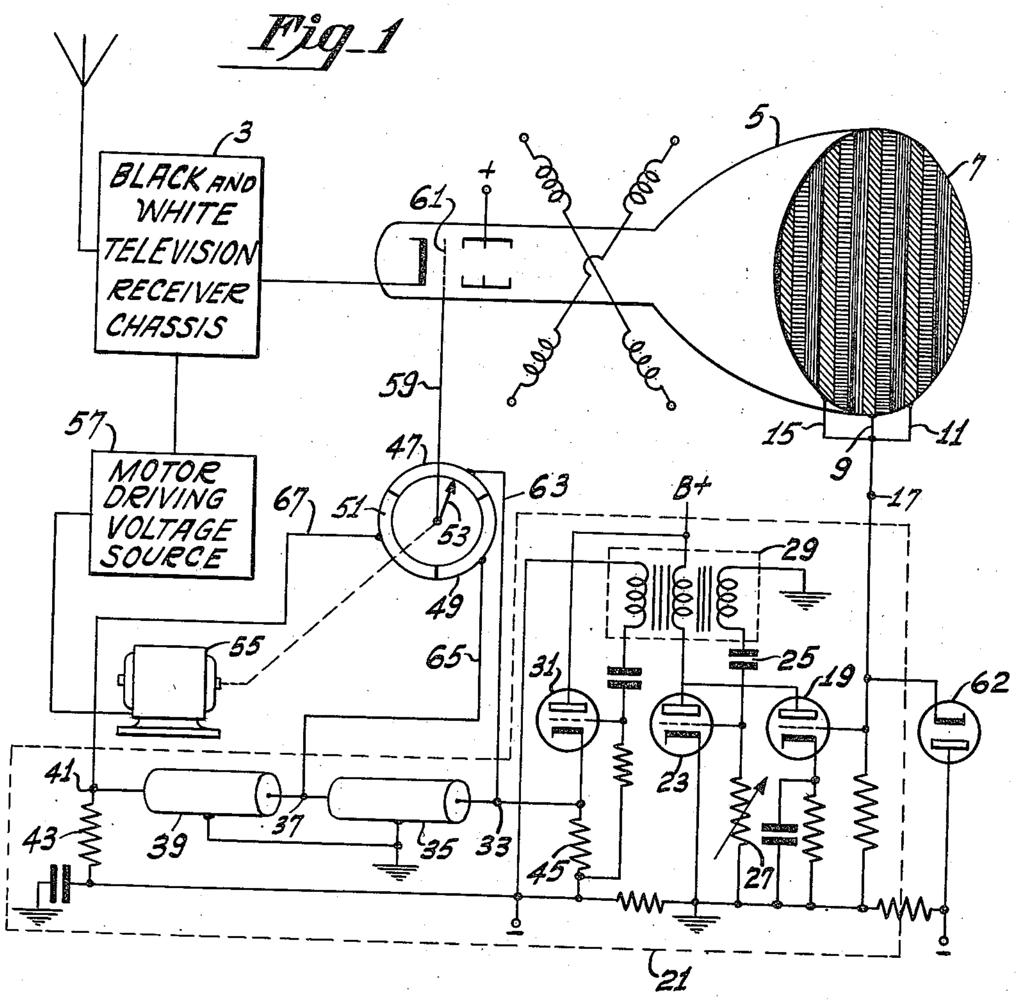
Figure 2:
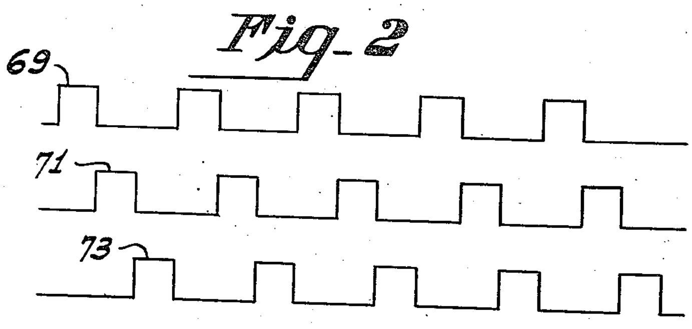

This invention relates to color television and more particularly this invention relates to arrangements for providing reproductions of images in substantially their natural color from sequential type color television signals.

In the color television system known as field sequential, it is customary to transmit separate images or television scanning frames in succession, the successive images or frames transmitted being representative of a particular color of the subject matter being transmitted. The transmitted signals are received at a television receiver and are then used to produce successive black and white images which are viewed through different color filters, the different color filters used being mounted on a wheel and rotated in rapid succession in synchronization with the transmission of the separate color images and in synchronization with the movement of corresponding filters at the television transmitter.

In the above described system the size of the picture at the receiver is limited by the diameter of the wheel on which the color filters are mounted. If this diameter is too large the wheel becomes cumbersome. Further, its rim velocity increases and the filters tend to fly apart.

An object of this invention is to provide for improved reproduction of television images in substantially their natural color.

Another object of this invention is to provide a television receiver capable of reproducing a color image from a sequential color television signal.

A further object of this invention is to provide a receiver capable of reproducing a color image from a field sequential color television signal, in which moving or rotating color filters have been eliminated.

Another object of this invention is to provide an adapter to enable a black-and-white television receiver to reproduce a color image from a sequential television signal.

According to this invention the target area of the kinescope comprises strip-like color light producing elements corresponding to different component colors. Tracking signal strips associated with said target area are made responsive to the passage of the kinescope scanning beam and generate tracking signals synchronous with the passage of the beam over said strips. Electrical circuit means are provided to derive from the tracking signals, "$n$" trains of keying pulses where "$n$" equals the number of different selected colors. The phase difference between the pulses of two consecutive pulse trains is $$\frac{360}{n}$$

electrical degrees. A commutator selects at sequential rate one of the keying pulse trains, and applies it to a control electrode of the kinescope to activate the beam only when it passes over the color strips representing the particular color being transmitted at the particular time.

Other and incidental objects of the invention will be apparent to those skilled in the art from a reading of the following specification and an inspection of the accompanying drawing in which there is shown by block and circuit diagram one form of this invention.

Referring now to the drawing, there is shown a color television receiver in accordance with the invention and comprising a standard black-and-white television receiver chassis 3 and a standard black-and-white kinescope 5. This may, for example, take the form of a television receiver shown and described in an article entitled "Television Receivers," RCA Review for March 1947.

A ruled color mask 7 is introduced in the target area of the kinescope by superimposition of the mask upon the face of the kinescope 5. This ruled color mask is made of transparent material and comprises alternating strip-like filter elements corresponding to the three primary colors—red, green, and blue. Although the strip-like elements are shown vertically positioned, and in the form of elongated rectangles, it is to be understood that they may be placed in some other position and that their shape may be varied. This ruled color mask also comprises tracking signal strips 9, 11, and 15, which may be thin wires embedded in the mask, or transparent conductors such as coatings of stannic oxide. These tracking signal strips are spaced in a predetermined way over the color mask and are connected together by means of lead 17 which connects the strips to the grid of an amplifier tube 19. This tube 19 is part of a keyer 21. Also part of keyer 21 is a blocking oscillator comprising vacuum tube 23, capacitor 25, resistor 27, and transformer 29. The keyer further includes vacuum tube 31 which couples the blocking oscillator output to a delay line. This delay line has an input terminal 33, a first section 35 placed between terminal 33 and a center tap 37, a second section 39 placed between center tap 37 and output terminal 41, and terminal resistors 43 and 45. Terminal 33, center tap 37, and terminal 41 are connected to consecutive segments 47, 49, and 51 of a commutator. The rotating contact arm 53 of the commutator is mechanically driven by means of synchronous motor 55. Motor 55 is driven by a voltage source 57 which derives its voltage from the vertical synchronizing pulses of the receiver 3. The contact arm 53 of the commutator is connected by means of lead 59 to the control electrode 61 of the kinescope 5. Lead 17 is also connected to the cathode of a diode 62 whose anode is negatively biased.

The operation of the color television receiver shown in Figure 1 will now be described. Let us assume that the tracking signal strips are located at the green strip-like segments of the color mask 7. As the beam of the kinescope travels across the face of the tube tracking signals are generated by the tracking signal strips in synchronism with the passage of the beam over the green strips. These tracking signals, which are in the form of pulses, are applied to the grid of amplifier tube 19 which is normally non-conducting. The amplified tracking signals trip the blocking oscillator which generates a train of pulses. This train of pulses is applied through terminal 33 and over lead 63 to segment 47 of the commutator. This same train of pulses is delayed by 120° by section 35 of the delay line and applied through center tap 37 and lead 65 to segment 49 of the commutator, and further delayed by another 120° by section 39 of the delay line and applied through terminal 41 and lead 67 to segment 51 of the communtator. In effect there are applied to the three segments 47, 49, and 51 of the commutator three trains of pulses represented by wave forms 69, 71, and 73. The pulses of each train are 120° out of phase with the pulses of each of the other pulse trains.

The commutator arm 53 selects one of these trains of pulses and applies it to the control grid 61 of the kinescope to activate the kinescope beam, and effects this selection at the sequential rate. When signals corresponding to the green color information are applied to the cathode of the kinescope 5, the train of pulses 69 present on commutator segment 47 is applied by way of commutator arm 53 and lead 59 to the kinescope grid 61 to activate the kinescope beam only when that beam is opposite the green strip-like filter elements. When the next color sequence occurs, and signals corresponding to, let us say, blue color information are applied to the cathode of the kinescope 5, the train of pulses 71 present on commutator segment 49 is applied in the same manner to the kinescope grid 61 to activate the kinescope beam only when that beam is opposite the blue strip-like filter elements. When the next color sequency occurs, and signals corresponding to red color information are applied to the cathode of the kinescope 5, the train of pulses 73 present on commutator segment 51 is applied in the same manner to the kinescope only when that beam is opposite the red strip-like filter elements.

A negative voltage is applied to one end of resistors 43 and 45 to provide a negative bias to the grid 61 of the kinescope 5. This bias should be such that the kinescope beam is not entirely cut off between pulses, so that it will still provide tracking information. The tracking signals are clipped by means of diode 62, whose anode is negatively biased, in order to apply uniform tracking signals to the grid of tube 19.

Some delay occurs between the time a tracking signal is generated and the time a pulse corresponding to that tracking signal is applied to the grid 61 of the kinescope by means of commutator arm 53 and commutator segment 47. This time delay may be such as to activate the kinescope beam at the wrong time, i. e. when it faces a red strip-like filter element while green color information is supplied to the kinescope's cathode. This difficulty may be obviated and the delay properly adjusted by varying the value of resistor 27 which is part of the "RC" circuit of the blocking oscillator. This adjustment can be made by the operator of the receiver.

The mask, the keyer, and the commutator are parts of adapter which enables a black-and-white television receiver to reproduce a color image from a sequential television signal. The mask and black-and-white kinescope may also be combined into a color kinescope in which the mask is made an integral part of the kinescope's screen, or into one in which there is provided a ruled phosphor screen comprising tracking signal strips.

The motor driven commutator may, of course, be replaced by an electronic commutator performing the same function.

A possible modification of applicant's invention would be to obtain the three trains of keying pulses directly from the target area of the kinescope by having three sets of tracking signal generating strips, each set corresponding to a given color. Each set of tracking signal generating strips would generate a train of keying pulses, and would be connected to a segment of a commutator. The commutator would select the proper train of pulses at sequential rate, amplify it, and apply it to the control electrode of the kinescope to activate the beam as previously described. This may be considered a feedback arrangement wherein the degree of feedback is such as to provide the proper operating biases for the kinescope.

Having described my invention, what is claimed is:

1. A color television receiver adapted to receive television signals in which the color information is transmitted at a sequential rate and comprising in combination, a kinescope having a target area comprising alternating strip-like filter elements corresponding to different colors, means to generate an electron beam within said kinescope, a control electrode system within said kinescope to control the intensity of said electron beam, tracking signal strips associated with said target area to generate tracking signals synchronous with the passage of said electron beam over said strips, means to derive from said tracking signals "$n$" trains of keying pulses, the phase difference between the pulses of two consecutive pulse trains being $$\frac{360}{n}$$

electrical degrees, means to impress said color television signals upon said control electrode system at said sequential rate, and means including commutator apparatus to apply said pulse trains successively and at said sequential rate to the control electrode system of said kinescope and with such polarity as to increase the intensity of said electron beam.

2. An adapter to enable a black-and-white television receiver to reproduce a color image from a sequential television signal, said black and white receiver comprising a kinescope having means to generate an electron beam and a control electrode system to control the intensity of said electron beam, said adapter comprising a ruled color mask comprising alternating strip-like filter elements corresponding to different component colors and tracking signal strips to generate tracking signals synchronous with the passage of said beam over said strips, means to derive from said tracking signals "$n$" trains of keying pulses, the phase difference between the pulses of two consecutive pulse trains being $$\frac{360}{n}$$

electrical degrees, means to impress said color television signals upon said control electrode system at said sequential rate, and means including commutator apparatus to apply said pulse trains successively and at said sequential rate to the control electrode system of said kinescope and with such polarity as to increase the intensity of said electron beam.

3. A color television receiver adapted to receive television signals in which the color information is transmitted at a sequential rate and comprising, in combination, a kinescope having a target area comprising alternating strip-like filter elements corresponding to a plurality of different colors, means to generate an electron beam within said kinescope, a control electrode system within said kinescope to control the intensity of said electron beam, tracking signal strips associated with said target area to generate tracking signals synchronous with the passage of said electron beam over said tracking signal strips, means to derive from said tracking signals a plurality of trains of keying pulses, the phase relationship of the pulses of the different trains being such that the pulses of a train occur synchronously with the passage of said electron beam over the strip-like filter elements corresponding to one of said colors, means to impress said color television signals upon said control electrode system at said sequential rate, and means including commutator apparatus to select at said sequential rate one of said keying pulse trains and to apply it to the control electrode system of said kinescope and with such polarity as to increase the intensity of said electron beam.

4. An adapter to enable a black-and-white television receiver to reproduce a color image from a sequential television signal, said black-and-white receiver comprising a kinescope having means to generate an electron beam and a control electrode system to control the intensity of said electron beam, said adapter comprising a ruled color mask comprising alternating strip-like filter elements corresponding to different colors and tracking signal strips to generate tracking signals synchronous with the passage of said electron beam over said tracking signal strips, means to derive from said tracking signals a plurality of trains of keying pulses, the phase relationship of the pulses of the different trains being such that the pulses of a train occur synchronously with the passage of said electron beam over the strip-like filter elements corresponding to one of said colors, commutator means to select at said sequential rate one of said keying pulse trains, means to impress said color television signals upon said control electrode system at said sequential rate, and means to apply said train to the control electrode system of said kinescope and with such polarity as to increase the intensity of said electron beam.

5. A color television receiver adapted to receive television signals in which the color information is transmitted at a sequential rate and comprising in combination, a kinescope having a target area comprising alternating strip-like color light producing elements corresponding to different colors, means to generate an electron beam within said kinescope, a control electrode system within said kinescope to control the intensity of said electron beam, tracking signal strips associated with said target area to generate tracking signals synchronous with the passage of said electron beam over said strips, means to derive from said tracking signals "$n$" trains of keying pulses, the phase difference between the pulses of two consecutive pulse trains being $$\frac{360}{n}$$

electrical degrees, means to impress said color television signals upon said control electrode system at said sequential rate, and means including commutator apparatus to apply said pulse trains successively and at said sequential rate to the control electrode system of said kinescope and with such polarity as to increase the intensity of said electron beam.

6. An adapter to enable a black-and-white television receiver to reproduce a color image from a sequential television signal, said black-and-white receiver comprising a kinescope having means to generate an electron beam and a control electrode system to control the intensity of said electron beam, said adapter comprising a ruled color mask comprising alternating strip-like color light producing elements corresponding to different component colors and tracking signal strips to generate tracking signals synchronous with the passage of said beam over said strips, means to derive from said tracking signals "$n$" trains of keying pulses, the phase difference between the pulses of two consecutive pulse trains being $$\frac{360}{n}$$

electrical degrees, means to impress said color television signals upon said control electrode system at said sequential rate, and means including commutator apparatus to apply said pulse trains successively and at said sequential rate to the control electrode system of said kinescope and with such polarity as to increase the intensity of said electron beam.

7. A color television receiver adapted to receive television signals in which the color information is transmitted at a sequential rate and comprising, in combination, a kinescope having a target area comprising alternating strip-like color light producing elements corresponding to a plurality of different colors, means to generate an electron beam within said kinescope, a control electrode system within said kinescope to control the intensity of said electron beam, tracking signal strips associated with said target area to generate tracking signals synchronous with the passage of said electron beam over said tracking signal strips, means to derive from said tracking signals a plurality of trains of keying pulses, the phase relationship of the pulses of the different trains being such that the pulses of a train occur synchronously with the passage of said electron beam over the strip-like color light producing elements corresponding to one of said colors, means to impress said color television signals upon said control electrode system at said sequential rate, and means including commutator apparatus to select at said sequential rate one of said keying pulse trains and to apply it to the control electrode system of said kinescope and with such polarity as to increase the intensity of said electron beam.

8. An adapter to enable a black-and-white television receiver to reproduce a color image from a sequential television signal, said black-and-white receiver comprising a kinescope having means to generate an electron beam and a control electrode system to control the intensity of said electron beam, said adapter comprising a ruled color mask comprising alternating strip-like color light producing elements corresponding to different colors and tracking signal strips to generate tracking signals synchronous with the passage of said electron beam over said tracking signal strips, means to derive from said tracking signals a plurality of trains of keying pulses, the phase relationship of the pulses of the different trains being such that the pulses of a train occur synchronously with the passage of said electron beam over the strip-like color light producing elements corresponding to one of said colors, commutator means to select at said sequential rate one of said keying pulse trains, means to impress said color television signals upon said control electrode system at said sequential rate, and means to apply said train to the control electrode system of said kinescope and with such polarity as to increase the intensity of said electron beam.

9. A color television receiver adapted to receive television signals in which the color information is transmitted at a sequential rate and comprising in combination, a kinescope having a target area comprising alternating strip-like phosphor elements corresponding to different colors, means to generate an electron beam within said kinescope, a control electrode system within said kinescope to control the intensity of said electron beam, tracking signal strips associated with said target area to generate tracking signals synchronous with the passage of said electron beam over said strips, means to derive from said tracking signals "$n$" trains of keying pulses, the phase difference between the pulses of two consecutive pulse trains being $$\frac{360}{n}$$

electrical degrees, means to impress said color television signals upon said control electrode system at said sequential rate, and means including commutator apparatus to apply said pulse trains successively and at said sequential rate to the control electrode system of said kinescope and with such polarity as to increase the intensity of said electron beam.

10. A color television receiver adapted to receive television signals in which the color information is transmitted at a sequential rate and comprising, in combination, a kinescope having a target area comprising alternating strip-like phosphor elements corresponding to a plurality of different colors, means to generate an electron beam within said kinescope, a control electrode system within said kinescope to control the intensity of said electron beam, tracking signal strips associated with said target area to generate tracking signals synchronous with the passage of said electron beam over said tracking signal strips, means to derive from said tracking signals a plurality of trains of keying pulses, the phase relationship of the pulses of the different trains being such that the pulses of a train occur synchronously with the passage of said electron beam over the strip-like phosphor elements corresponding to one of said colors, means to impress said color television signals upon said control electrode system at said sequential rate, and means including commutator apparatus to select at said sequential rate one of said keying pulse trains and to apply it to the control electrode system of said kinescope and with such polarity as to increase the intensity of said electron beam.

References Cited in the file of this patent

UNITED STATES PATENTS

| | | |
|---|---|---|
| 2,431,115 | Goldsmith | Nov. 18, 1947 |
| 2,473,276 | Chew | June 14, 1949 |
| 2,532,511 | Okolicsanyi | Dec. 5, 1950 |
| 2,545,325 | Weimer | Mar. 13, 1951 |